(12) United States Patent
Krais et al.

(10) Patent No.: US 11,152,827 B2
(45) Date of Patent: Oct. 19, 2021

(54) END PLATE FOR A ROTOR ASSEMBLY OF AN ELECTRICAL MACHINE, ROTOR ASSEMBLY FOR AN ELECTRICAL MACHINE, AND VEHICLE

(71) Applicant: VALEO SIEMENS EAUTOMOTIVE GERMANY GMBH, Erlangen (DE)

(72) Inventors: Nils Krais, Strahlungen (DE); Philipp Söntgerath, Niederkrüchten (DE); Sebastian Waider, Petersberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/522,802

(22) Filed: Jul. 26, 2019

(65) Prior Publication Data
US 2020/0036248 A1    Jan. 30, 2020

(30) Foreign Application Priority Data
Jul. 27, 2018    (DE) .................... 10 2018 118 274.0

(51) Int. Cl.
*H02K 1/32*    (2006.01)
*H02K 1/27*    (2006.01)
(Continued)

(52) U.S. Cl.
CPC .............. *H02K 1/32* (2013.01); *H02K 1/276* (2013.01); *H02K 1/30* (2013.01); *H02K 7/006* (2013.01); *H02K 21/14* (2013.01); *B60K 1/00* (2013.01)

(58) Field of Classification Search
CPC ............ H02K 1/27; H02K 1/30; H02K 21/14; H02K 7/00; H02K 1/276; H02K 5/124;
(Continued)

(56) References Cited

U.S. PATENT DOCUMENTS 4,544,855 A * 10/1985 Prenner .................... H02K 9/06
310/59
5,763,969 A * 6/1998 Metheny .................. H02K 9/14
310/52
(Continued)

FOREIGN PATENT DOCUMENTS

| DE | 102011121042 A1 | 6/2012 |
|---|---|---|
| EP | 1953896 A1 | 8/2008 |
| JP | 2012-105487 A | 5/2012 |

*Primary Examiner* — Naishadh N Desai
(74) *Attorney, Agent, or Firm* — Manabu Kanesaka

(57) ABSTRACT

An end plate for a rotor assembly of an electrical machine includes a central through-opening for a shaft, a collar formed on an end face of the end plate on the radial outside in the circumferential direction and a plurality of elevations on the end face. The elevations and collar axially delimit a cooling channel, wherein the cooling channel forms a plurality of cooling channel sections on both sides by a respective elevation. Two elevations delimiting a cooling channel section are spaced apart from one another by a first arc length at a first radial position between the through-opening and the collar and are spaced apart from one another by a second arc length greater than the first arc length at a second radial position delimited by the collar. Each cooling channel section includes at least one fluid guide element between the first radial position and the second radial position.

15 Claims, 7 Drawing Sheets

(51) Int. Cl.
*H02K 21/14* (2006.01)
*H02K 7/00* (2006.01)
*H02K 1/30* (2006.01)
*B60K 1/00* (2006.01)

(58) Field of Classification Search
CPC .......... H02K 1/32; H02K 1/2766; H02K 9/19; H02K 7/006; B60K 11/02; B60K 2001/006; B60K 1/00
See application file for complete search history.

(56) References Cited

U.S. PATENT DOCUMENTS 8,080,908 B2 * 12/2011 Matsubara ........... H02K 1/2766
310/61
2019/0207451 A1 * 7/2019 Yoshizawa ............... H02K 1/32

* cited by examiner

END PLATE FOR A ROTOR ASSEMBLY OF AN ELECTRICAL MACHINE, ROTOR ASSEMBLY FOR AN ELECTRICAL MACHINE, AND VEHICLE

RELATED APPLICATIONS

The present application is based on, and claims priority from, German Application No. 10 2018 118 274.0 filed Jul. 27, 2018, the disclosure of which is hereby incorporated by reference herein in its entirety.

The present invention relates to an end plate for a rotor assembly of an electrical machine, comprising a central through-opening for feeding through a shaft, a collar formed on the radial outside in the circumferential direction on an end face of the end plate, and multiple elevations on the end face, wherein the elevations and the collar axially delimit a cooling channel, wherein the cooling channel forms multiple cooling channel sections, which are delimited on both sides by a respective elevation, wherein two elevations delimiting a cooling channel section are spaced apart from one another by a first arc length at a first radial position between the through-opening and the collar and are spaced apart from one another by a second arc length that is greater than the first arc length at a second radial position delimited by the collar.

In addition, the invention relates to a rotor assembly for an electrical machine and to a vehicle.

During the operation of electrical machines, alternating magnetic fields are generated which cause iron losses. The iron losses generate heat in a rotor core and heat permanent magnets arranged there, wherein it is imperative that a demagnetization temperature of the permanent magnets is not exceeded. So as to improve the performance capability of the electrical machine, it is known to dissipate heat from the permanent magnets. In electrical machines having high utilization rates, such as those in vehicles including electric drive systems, this can be achieved by cooling a shaft that is non-rotatably connected to the rotor core.

The document DE 10 2011 121 042 A1 discloses a cooling system for an electrical machine comprising a rotor including a plurality of permanent magnets, which are each arranged in a magnet pocket. A plurality of axially extending first cooling channels is arranged on an inner circumference of a rotor core, and at least one through-opening is arranged in each case in a rotor carrier between an interior space of the rotor and a first cooling channel, wherein a respective oil ring is arranged at the ends of the rotor core, in which channels for fluidically coupling the first cooling channel and the magnet pocket or end-face openings of the magnet pocket are arranged. The channels are designed as open channels in the oil ring, which, due to the arrangement on a last rotor segment of the rotor core, form a cooling line that is closed in the circumferential direction. A respective radial channel in the oil ring has a V-shaped design.

It is the object of the invention to provide an improved option for forming a cooling channel including multiple cooling channel sections through an end-face end plate.

So as to achieve the object, according to the invention it is provided in an end plate of the type described at the outset that a respective cooling channel section comprises at least one fluid guide element between the first radial position and the second radial position.

The invention is based on the realization that, in conventional end plates, the targeted introduction of the cooling fluid into clearances of the magnet pockets or the arrangement of the permanent magnets in the magnet pockets can be significantly improved by the additional fluid guide element. By virtue of the fluid guide element, the cooling fluid can be introduced into the clearances at an optimal flow cross-section. In addition, the at least one fluid guide element can provide a support surface against which a permanent magnet accommodated in the magnet pocket can be supported so as to delimit, and in particular suppress, a movement of the permanent magnet in the axial direction.

The invention advantageously achieves a distribution of the cooling fluid within the magnet pockets which is enhanced in terms of fluid mechanics, thereby enabling higher cooling power of the electrical machine. At the same time, by virtue of the fluid guide element, it is possible to achieve an inhibition of the axial movement of the permanent magnet without additional components, thereby resulting in higher mechanical stability of the rotor assembly.

Typically, the rotor core comprises a permanent magnet system including at least one permanent magnet for each cooling channel or some of the cooling channels. In a particularly preferred embodiment, a permanent magnet system comprises a radially inner pair of permanent magnets arranged in a V-shaped manner, and a radially outer pair of permanent magnets arranged in a V-shaped manner.

In the end plate according to the invention, a fluid guide element can be provided which is formed by a protrusion of an elevation. The fluid guide element, which is also referred to hereafter as a first fluid guide element, thus implements an indentation narrowing the cooling channel section. The first fluid guide element is preferably used to support a permanent magnet, and in particular a radially inner permanent magnet.

It is furthermore advantageous in the end plate according to the invention when a fluid guide element is provided which is formed by a free elevation, having the same extension in two orthogonal directions of a plane that is perpendicular to the axial direction. Such a fluid guide element, which is also referred to as a second fluid guide element hereafter, is advantageously used to support a radially outer permanent magnet. The free elevation is preferably circular.

It is particularly preferred to arrange the (first) fluid guide element formed by the protrusion further to the radial inside than the (second) fluid guide element formed by the free elevation, A partial cooling channel, which guides the cooling fluid to radially outer clearances of the magnet pockets, is thus formed between the first and second fluid guide elements.

Furthermore, a fluid guide element which is formed by a free elevation extending longitudinally in the radial direction can be provided in the end plate according to the invention. Such a fluid guide element, which is also referred to as a third fluid guide element, is typically used primarily for optimizing the cooling channel in terms of fluid mechanics.

Particularly preferably, a further fluid guide element that is symmetrical with respect to a plane extending in the radial direction through the center of the cooling channel section is provided for the fluid guide element or a respective fluid guide element. In particular, the third fluid guide elements are not spaced apart from one another any further than the first arc length on the radial inside and/or are spaced apart further from one another on the radial outside than on the radial inside. The third fluid guide elements thus form a partial cooling channel so as to guide the cooling fluid to the inner clearances of the radially outer permanent magnets.

In addition, a fluid guide element can be provided which is designed as a protrusion projecting centrally from the collar into the cooling channel section. This protrusion optimizes the cooling fluid flow between the radially outer permanent magnets.

In the end plate according to the invention, a respective cooling channel section can extend to the through-opening. In this way, the cooling fluid is conducted introduced into the magnet pockets, or discharged therefrom, through each cooling channel section. A cooling path can thus be implemented from the shaft, through the cooling channel sections of the end plate and the magnet pockets, through the cooling channel sections of a further end plate, back into the shaft.

Particularly preferably, the cooling channel sections continue in a linear manner from the first radial position to the through-opening. A cross-section of the cooling channel sections which is advantageous in terms of fluid mechanics can thus be predefined between the through-opening and the first radial position.

So as to achieve advantageous spray cooling of winding heads of the electrical machine, the end plate can moreover include cooling fluid outlet sections, which are delimited by the elevations and which are formed between the first radial position and the second radial position and connected via a cooling fluid outlet channel to an opening formed in the end plate. Advantageously, the cooling fluid outlet sections are separated from the through-opening by one of the elevations or the elevations.

The openings are particularly preferably formed on a lateral surface of the end plate. For this purpose, a first portion of the cooling fluid outlet channel can extend in the axial direction from the cooling fluid outlet section, and a second portion can open into the opening in the radial direction. The cooling fluid outlet channel thus achieves a change in direction of the cooling fluid flow.

Advantageously, the cooling fluid outlet sections and the cooling channel sections are arranged alternately in the circumferential direction. In this way, spray cooling that is as uniform as possible can be achieved.

In addition, it is preferred when a respective cooling fluid outlet section comprises at least one fluid guide element. The at least one fluid guide element formed in the cooling fluid outlet section can be designed in keeping with one or more of the above-described fluid guide elements of the cooling channel sections. Particularly preferably, the cooling fluid outlet sections comprise the first fluid guide element and/or the second fluid guide element. In this way, the permanent magnets can also be supported in the region of the cooling fluid outlet sections.

In addition, the invention relates to a rotor assembly for an electrical machine, comprising a rotor core, multiple permanent magnets, which are each arranged inside a magnet pocket formed in the rotor core, forming a clearance extending in the axial direction, a shaft, which is non-rotatably connected to the rotor core, and at least one end plate as described, which is arranged at the end face on the rotor core.

In addition, it is further advantageously provided in the rotor assembly according to the invention that a cooling channel system is formed inside the rotor assembly, which can comprise a first cooling channel that extends inside the shaft, a second cooling channel that is connected to the first cooling channel in a fluid-conducting manner and extends in the radial direction along an end face of the rotor core, and a third cooling channel that connects to the second cooling channel and extends in the axial direction through the clearances in the magnet pockets. The cooling channel sections of the end plate can form the second cooling channel at least partially. In other words, the cooling channel sections of the end plate correspond to those of the second cooling channel. The second cooling channel is consequently delimited by the end plate and the elevations thereof on the one hand, and by an end face of the rotor core on the other hand. The second cooling channel preferably connects to the first cooling channel.

The cooling channels are preferably designed to guide a liquid cooling fluid, such as oil, water or a glycol/water mixture. However, it is also conceivable for the cooling channels to be designed to guide a gaseous cooling fluid. Advantageously, the permanent magnets can be free of rare earths since the cooling strategy implemented in the rotor assembly according to the invention eliminates the need for such permanent magnets suitable for high temperatures. The separating element typically comprises a separating section, which extends along an inner radius of the shaft in the circumferential direction.

With respect to the rotor core of the rotor assembly according to the invention, it is preferred when multiple magnet pocket systems are each formed of several of the magnet pockets, the clearances of which each form a cooling channel section of the third cooling channel. This enables enhanced cooling of the rotor assembly in that the third cooling channel is subdivided into the multiple cooling channel sections.

It is further preferred when each magnet pocket system comprises two pairs of magnet pockets that are arranged in a V-shaped manner, the pairs being spaced apart from one another radially. In this way, it is also possible to efficiently cool rotor assemblies comprising so-called "double-V" permanent magnets.

Advantageously, it is provided in the rotor assembly according to the invention that each magnet pocket forms a further clearance inside the magnet pocket, wherein the third cooling channel also extends through the further clearance. In other words, a respective permanent magnet separates the two clearances formed inside a magnet pocket. This enables particularly uniform cooling of the permanent magnets.

Preferably, it is further provided in the rotor assembly according to the invention that the second cooling channel is formed partially by through-holes extending through the shaft for connecting to the first cooling channel. Advantageously, conventional rotor assemblies can thus be retrofitted with low complexity without cooling the permanent magnets by forming only additional through-holes at appropriate axial positions of the shaft. Typically, one through-hole is provided in the shaft for each cooling channel section of the second cooling channel.

So as to form the cooling path leading from the shaft through the rotor core back into the shaft, a separating element can be provided, which separates an interior of the shaft into a first shaft section, in which the first cooling channel extends, and a second shaft section, wherein the cooling channel system can include a fourth cooling channel, which connects to the third cooling channel and extends in the radial direction along the other end face of the rotor core into the second shaft section. Advantageously, a cooling circuit that can be supplied exclusively through the shaft can thus be implemented, in which cooling fluid can be prevented from exiting into a machine housing. The cooling fluid accordingly cannot find its way into an air gap between a rotor and a stator and generate undesirable drag losses there. In addition to reducing the risk of demagnetization, even during full load operation of the electrical machine, in this way a high power density of the electrical machine is also made possible. As a result of efficient cooling, moreover the use of less expensive permanent magnets having a lower demagnetization temperature is made possible, while maintaining the utilization of the machine.

Cooling channel sections of the fourth cooling channel can be formed at least partially by a second end plate according to the invention arranged on the rotor core. The fourth cooling channel is consequently delimited by the end plate and the elevations thereof on the one hand, and by an end face of the rotor core on the other hand. In other words, the cooling channel sections of the fourth cooling channel correspond to those of the second end plate. The cooling channel sections of the fourth cooling channel delimited by the end plate advantageously each connect to one of the cooling channel sections of the third cooling channel. Such end plates allow conventional rotor cores to be easily retrofitted for implementing the cooling strategy.

The separating element of the rotor assembly according to the invention preferably includes a fluid guide section which extends through the first shaft section to an axial position between the end faces of the rotor core and partially forms the second shaft section. The second shaft section can thus include the interior of the shaft up to the axial position and the section of the shaft delimited by an inner wall of the fluid guide section. The first shaft section can include the section of the shaft delimited by the separating section and the section of the shaft delimited by an outer wall of the fluid guide section. Advantageously, the fluid guide section is arranged coaxially with respect to the shaft. The fluid guide section typically opens into the separating element. In general, the fluid guide section is formed by a pipe. Typically, the rotor assembly also comprises a closure element, for example a dummy plug, which seals the second shaft section in a fluid-tight manner at a free end located opposite the first shaft section.

Particularly preferably, a connecting element is further provided in the rotor assembly according to the invention, with respect to which the shaft can be rotated, wherein a free end of the shaft associated with the first shaft section can open into the connecting element and be connected in a fluid-conducting manner to a feed channel of the connecting element. In this way, particularly simple end-side feeding of the first shaft section is achieved. The connecting element typically comprises a radial shaft seal in which the shaft can be rotated.

Particularly preferably, the fluid guide section opens into the connecting element and is connected in a fluid-conducting manner to a further feed channel. The connecting element consequently implements both an inflow and a return flow for the cooling fluid and thus enables particularly simple feeding of the shaft at only one free end.

The feed channel or the feed channels can extend in the radial direction. This prevents the axial extension of the rotor assembly from being extended by a fluid line that is connected to a feed channel so as to enable a space-saving implementation of the rotor assembly. Advantageously, the connecting element, on the lateral surface thereof, comprises at least one cooling fluid connection, which is connected in a fluid-conducting manner to the or a respective feed channel.

It is also possible for the first cooling channel to extend between a free end of the shaft and the second cooling channel, wherein a fifth cooling channel connecting to the fourth cooling channel extends to the other free end of the shaft. In this way, the cooling fluid can be supplied at a free end and discharged at another free end of the shaft. The separating section of the separating element then advantageously seals the shaft completely at an axial position between the end faces. In addition, the separating element can comprise an end section, which is arranged at the first free end so as to protrude into the interior of the shaft. A fluid guide section, which typically includes through-holes, can also be provided in this embodiment, whereby a fluid-conducting connection is formed between the first cooling channel and the second cooling channel.

So as to implement the above-described spray cooling of the stator windings, it is particularly preferred when the end plate delimiting the second cooling channel comprises the cooling fluid outlet sections, and a second end plate comprising the cooling fluid outlet sections is arranged on the end face of the rotor core which is located opposite the second cooling channel. In this way, spray cooling of the stator windings can be made possible at both end faces of the rotor core. It is particularly advantageous when the end plates are each arranged offset from one another by an odd-numbered multiple of the angular spacing between a cooling channel section and a cooling channel outlet section, or between a pair of adjoining magnet pockets.

Preferably, the cooling channel system comprises a further third cooling channel and a fourth cooling channel, which extends on the end face of the rotor core which is located opposite the second cooling channel and connects to the interior of the shaft or the first cooling channel, and in particular parallel to the second cooling channel in terms of fluid mechanics. Cooling channel sections of the fourth cooling channel can be formed at least partially by the second end plate. The fourth cooling channel is consequently delimited by the end plate and the elevations thereof on the one hand, and by an end face of the rotor core on the other hand. In other words, the cooling channel sections of the fourth cooling channel correspond to those of the second end plate The cooling channel sections of the third cooling channels can extend alternately along the rotor core with respect to the circumferential direction. Advantageously, the cooling channel sections of the third cooling channel connected to the second cooling channel open into the cooling fluid outlet sections of the second end plate, and the cooling channel sections of the other third cooling channel, which is to say the one connected to the fourth cooling channel, open into the cooling fluid outlet sections of the first end plate.

Furthermore, the fourth cooling channel can be formed at least partially by through-holes extending through the shaft for connecting to the interior of the shaft. This also serves simplified retrofittability. Typically, one through-hole is provided in the shaft for each cooling channel section of the fourth cooling channel.

It is particularly advantageous in the rotor assembly according to the invention when the separating element comprises a sealing means which seals the shaft sections with respect to one another. In this way, a substantial reduction of flow losses is achieved, which significantly improves the efficiency of the rotor assembly or of the electrical machine comprising the same. The sealing means is preferably an O-ring. Advantageously, the separating section includes a groove extending in the circumferential direction, in which the O-ring is arranged.

So as to prevent cooling fluid from exiting the shaft, it is further advantageous when at least one further sealing means is provided, which seals the end section and the shaft with respect to one another. Likewise, at least one further sealing means can be provided, which seals the closure element and the shaft with respect to one another.

A sealing means sealing the end section or the closure element can be an O-ring. As an alternative or in addition, the sealing means is an adhesive layer arranged on a surface of the end section or of the closure element. It is particularly preferred when the surface is roughened. The surface is typically the lateral surface of a substantially cylindrical portion of the end section or of the closure element.

So as to improve the sealing of the rotor assembly, the or a respective end plate can be sealed with respect to the rotor core by means of a further sealing means. The further sealing means is preferably arranged in the collar, which is located at an outer radial position on the side of the end plate facing the rotor core. A groove is advantageously formed in the collar, which accommodates the further sealing means. The further sealing means sealing the end plate with respect to the rotor core can be an O-ring.

Moreover, it is advantageous when the or a respective end plate is sealed with respect to the shaft by means of a further sealing means. For this purpose, the end plate, on the end face thereof facing away from the rotor core, can comprise a bead which surrounds the shaft and in which the further sealing means is accommodated. A groove is typically formed in the bead, which accommodates the further sealing means. The further sealing means sealing the end plate with respect to the shaft can be an O-ring.

So as to prevent the cooling fluid from exiting the rotor core, it can advantageously be provided that a lamination stack of the rotor core comprises an outer sealing layer or multiple outer sealing layers formed on top of one another, made of a resin material. The outer sealing layer forms a liquid barrier, which seals possible leakage areas between the sheets. Preferably, two outer sealing layers are provided. The sealing layers can be created by dipping the lamination stack once or multiple times into the resin material.

In addition, the invention relates to an electrical machine for a vehicle, comprising a stator and a rotor assembly according to the invention arranged inside the stator.

All comments made with respect to the end plate according to the invention can be applied analogously to the rotor assembly according to the invention. All comments made with respect to the rotor assembly according to the invention can be applied analogously to the electrical machine according to the invention and to the vehicle according to the invention, so that the above-described advantages can also be achieved with these.

Further advantages and details of the invention will be apparent from the exemplary embodiments described hereafter and based on the drawings. These are schematic illustrations. In the drawings.

Figure 1:
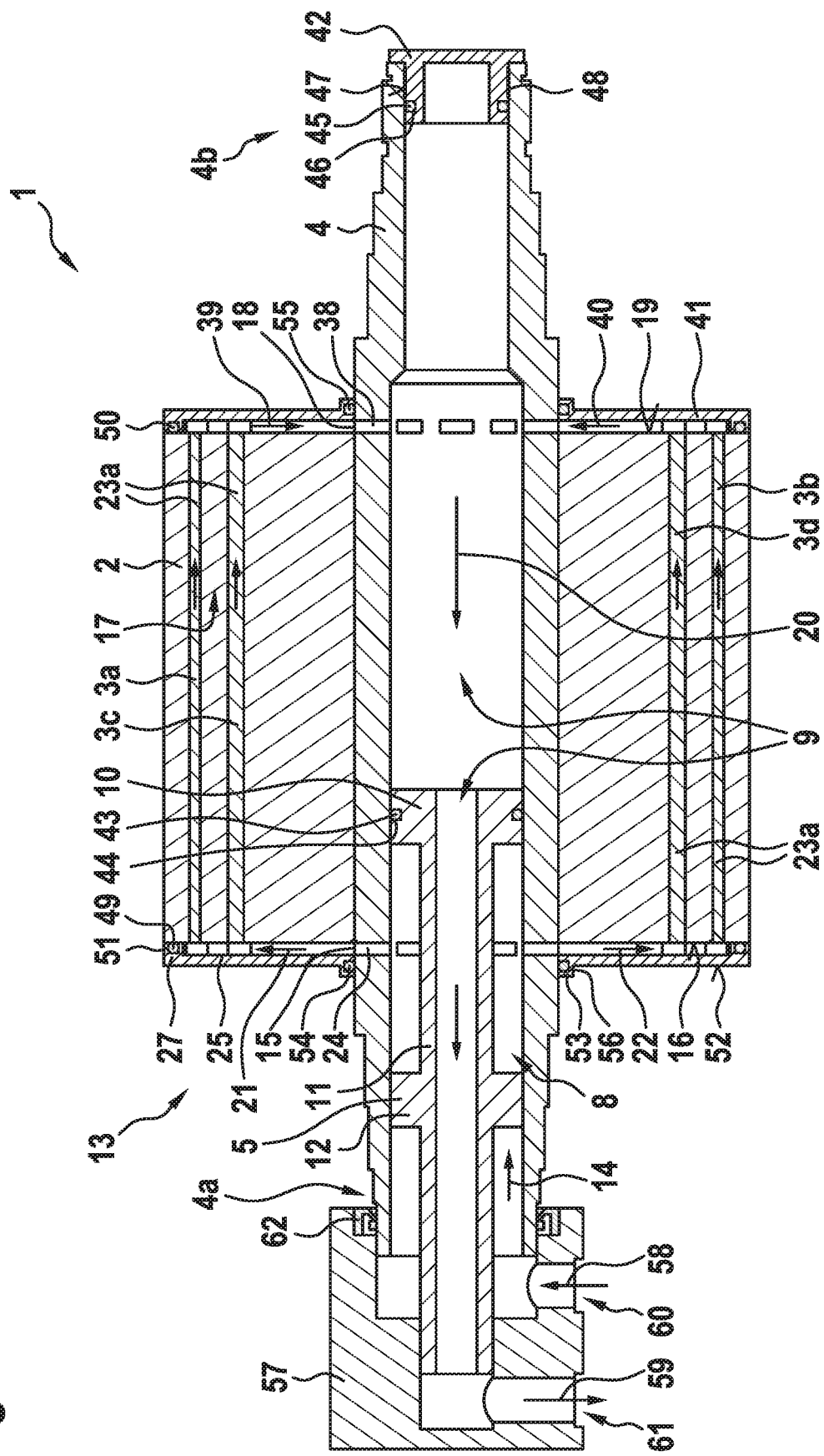
FIG. 1 shows a sectional view of a first exemplary embodiment of the rotor assembly according to the invention.
Figure 7:
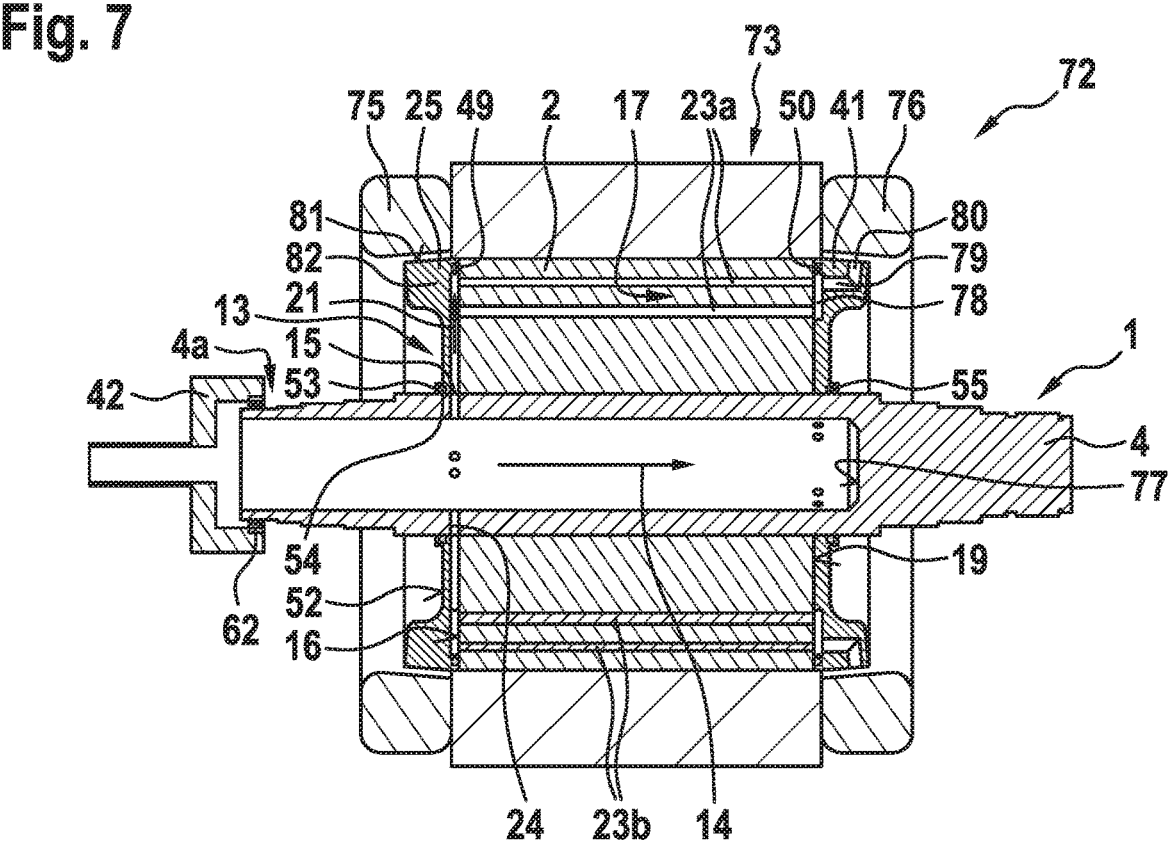
FIG. 7 shows a sectional illustration of a further exemplary embodiment of an electrical machine according to the invention.
Figure 8:
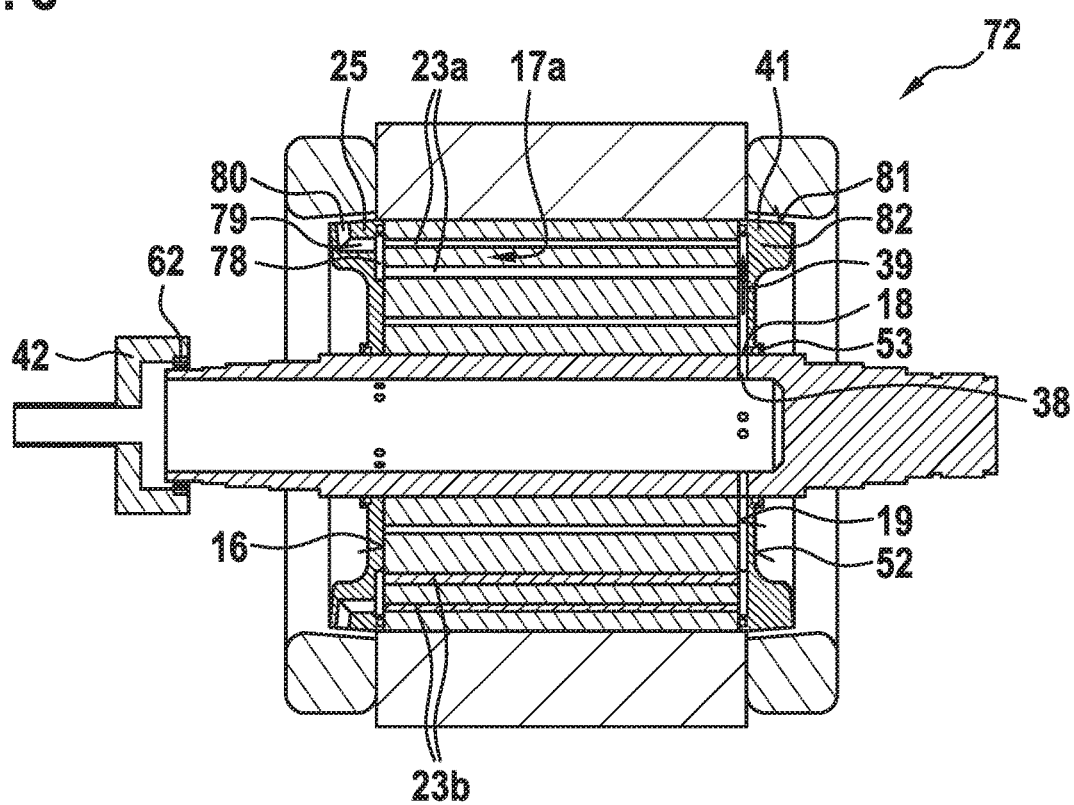
Figure 9:
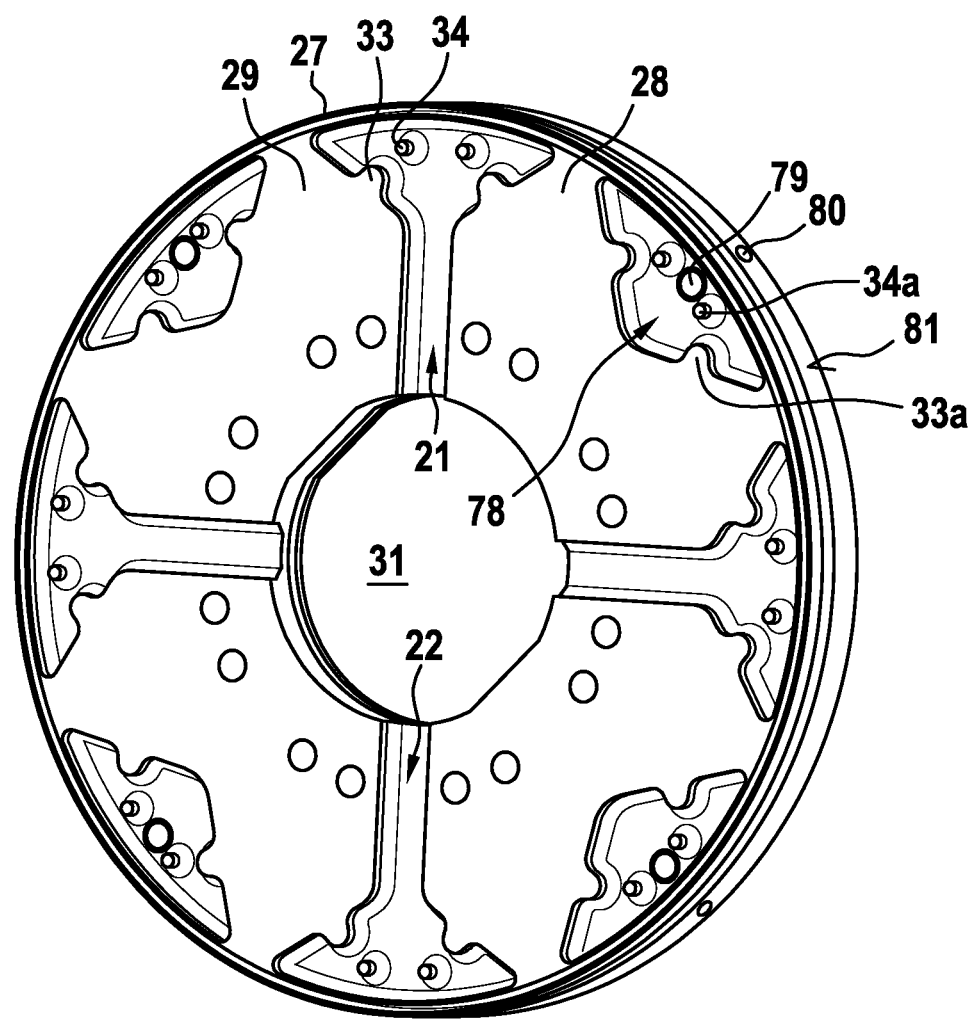

FIG. 8 shows another sectional illustration of the electrical machine shown in FIG. 7; and FIG. 9 shows a perspective illustration of an exemplary embodiment of the end plate according to the invention of the electrical machine shown in FIG. 7, FIG. 1 shows a sectional view of a first exemplary embodiment of a rotor assembly 1, comprising a rotor core 2, multiple permanent magnets 3a to 3d, a shaft 4, which is non-rotatably connected to the rotor core 2, and a separating element 5.

Figure 2:
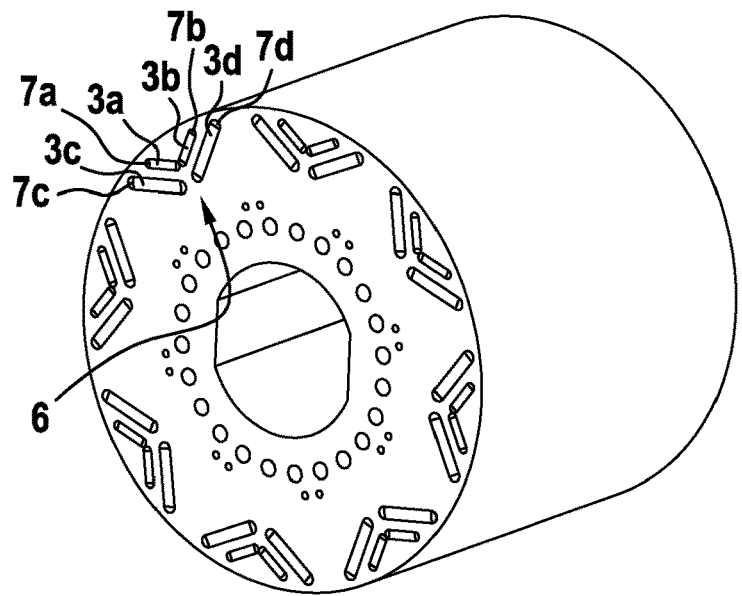
FIG. 2 shows a perspective view of a rotor core including permanent magnets accommodated therein of the rotor assembly shown in FIG. 1.

FIG. 2 shows a perspective illustration of the rotor core 2 including the permanent magnets 3a to 3d accommodated therein. The rotor core 2 is designed as a lamination stack comprising a plurality of laminated individual sheets. Inside the rotor core, a plurality of magnet pocket systems are formed, which in the present example are eight pieces spaced 45° apart from one another.

Each magnet pocket system 6 comprises a pair of magnet pockets 7a, 7b, in which the permanent magnets 3a, 3b are accommodated, and a pair of magnet pockets 7c, 7d, in which the permanent magnets 3c, 3d are accommodated. The magnet pocket system 6 forms a so-called "double V" arrangement in which each pair is arranged in a V-shaped manner, wherein the pair of magnet pockets 7a, 7b is arranged further to the radial outside than the pair of magnet pockets 7c, 7d. Clearances extending in the axial direction are formed inside the magnet pockets 7a to 7d on both sides of a respective permanent magnet 3a to 3d.

It is furthermore apparent from FIG. 1 that the separating element 5 separates the shaft into a first shaft section 8 and a second shaft section 9. For this purpose, the separating element 5 includes a separating section 10, which extends along an inner radius of the shaft 4 in the circumferential direction. A fluid guide section 11 of the separating element 5, which has a tubular design and extends from an axial position between two end faces 16, 19 of the rotor core 2 beyond a free end 4a of the shaft 4, opens into the separating section 10. The fluid guide section 11 consequently extends through the first shaft section 8 and continues the second shaft section 9 through the first. In addition, the separating element 5 includes a support section 12, which is arranged between the free end and the separating section 10 on the fluid guide section 11 and supports the separating element 5 in the first shaft section 8 in such a way that a cooling fluid is able to flow past the support section 12 through the first shaft section 8.

A cooling channel system 13 is formed inside the rotor assembly 1. This includes a first cooling channel 14, which extends in the axial direction in the interior of the shaft along the first shaft section 8. A second cooling channel 15 of the cooling channel system 13 extends in the radial direction along the end face 16 of the rotor core 2 and connects directly to the first cooling channel 14. In addition, a third cooling channel 17 is provided, which connects to the second cooling channel and extends in the axial direction through the clearances in the magnet pockets 7a to 7d. A fourth cooling channel 18 of the cooling channel system connecting to the third cooling channel 17 extends in the radial direction along the other end face 19 of the rotor core 2 and opens into the second shaft section 9, which forms a fifth cooling channel 20. In this way, a cooling path for the cooling fluid, which is shown in FIG. 1 by arrows, is formed, which extends from the free end 4a of the shaft 4 through the first shaft section 8, the rotor core 2 and the second shaft section 9 back to the free end 4a of the shaft 4.

The second cooling channel 15 includes multiple separate cooling channel sections 21, 22, to each of which a cooling channel section 23a, 23b of the third cooling channel 17 connects. Each cooling channel section 23a, 23b of the third cooling channel 17 is formed by the clearances of a magnet pocket system 6. In other words, each cooling channel section 23a, 23b is divided eight-fold by the clearances.

The second cooling channel 15 is formed in a radially inner portion by through-holes 24 inside the shaft 4. One through-hole 24 is provided in the shaft 4 for each cooling channel section 21, 22. A radially outer portion of the second cooling channel 15 connecting to the radially inner portion is delimited by the end face 16 of the rotor core 2 and by an exemplary embodiment of an end plate 25 of the rotor assembly 1.

Figure 3:
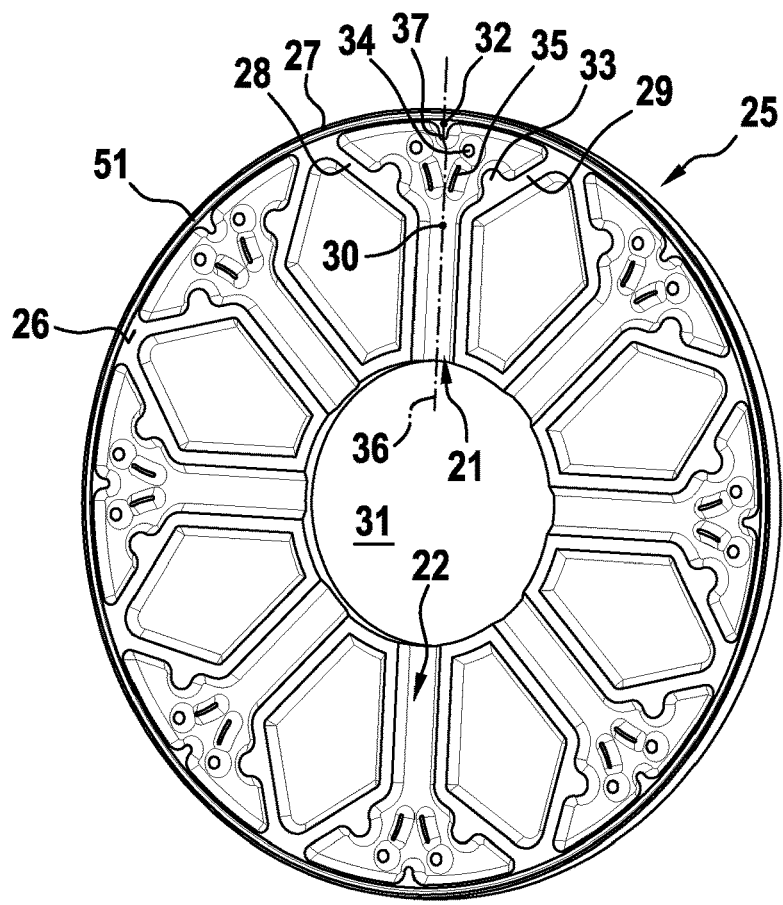
FIG. 3 shows a perspective illustration of an exemplary embodiment of the end plate according to the invention of the rotor assembly shown in FIG. 1.

FIG. 3 shows a perspective illustration of the end plate 25 with a view onto an end face 26 facing the end face 16 of the rotor core 2. A collar 27 is formed on the radial outside in the circumferential direction on the end face 26. In addition, multiple elevations 28, 29 are formed on the end face 26, which delimit the second cooling channel 15. Each cooling channel section 21, 22 of the second cooling channel 15 is delimited by a pair of adjoining elevations 28, 29. All cooling channel sections 21, 22 have an identical design, so that the description thereof hereafter is provided based on the cooling channel section 21:

The elevations 28, 29 are spaced apart from one another by a first arc length at a first radial position marked by a point 30. The first radial position is located between a through-opening 31 of the end plate 25 and the collar 27, which defines a second radial position marked by a point 32. At the second radial position, the elevations 28, 29 are spaced apart from one another by a second arc length, which is greater than the first arc length. The elevations 28, 29 thus form a substantially V-shaped portion of the cooling channel section 21, which corresponds to the arrangement of the magnet pockets 7a to 7d of one of the magnet pocket systems 6. From the first radial position, the cooling channel section 21 continues in a linear manner to the through-opening 31, where the elevations 28, 29 connect to one of the through-holes 24 (see FIG. 1).

Pairs of first fluid guide elements 33, second fluid guide elements 34 and third fluid guide elements 35 are provided inside a respective cooling channel section 21, 22, which are symmetrical with respect to a plane 36 extending in the radial direction through the center of the cooling channel section 21. Additionally, a fourth fluid guide element 37 is provided.

Figure 4:
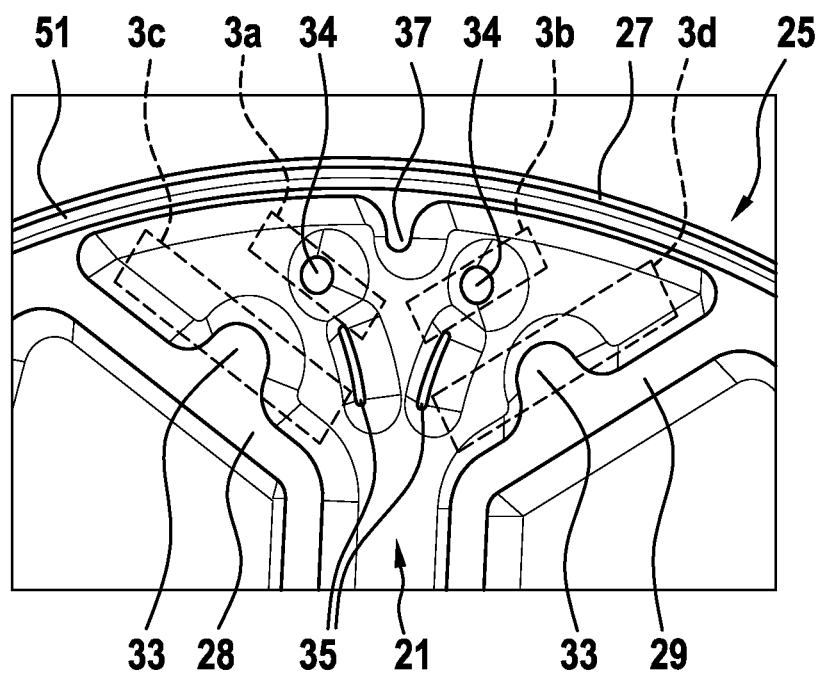
FIG. 4 shows a detailed illustration of the end plate shown in FIG. 3.

FIG. 4 shows a detailed illustration of the end plate 25 with projections of the positions of the permanent magnets 3a to 3d shown therein with dotted lines.

The first fluid guide elements 33 are each designed as protrusions of one of the elevations 28, 29 and support the radially inner pair of permanent magnets 3c, 3d. The second fluid guide elements 34 are designed as circular free elevations inside the cooling channel section 21 and support the radially outer pair of permanent magnets 3a, 3b. A movement of the permanent magnets 3a to 3d out of the magnet pockets 7a to 7b (see FIG. 2) is thus prevented. The first fluid guide elements 33 are accordingly arranged further to the radial inside than the second fluid guide elements 34. Furthermore, on one side of the plane 36, the first fluid guide element 33 and the second fluid guide element 34 form a partial cooling channel section, which improves the flow cross-section of the cooling fluid flowing into the radially outer clearances of the magnet pockets 7a to 7d (see FIG. 2).

The third fluid guide elements 35 are likewise designed as free elevations and extend in an arc-shaped manner in the radial direction. The third fluid guide elements 35 are spaced apart from one another less than the first arc length on the radial inside and are spaced apart further from one another on the radial outside than on the radial inside. The third fluid guide elements 35 likewise serve to improve the flow cross-section for the cooling fluid flowing into the radially inner clearances of the radially outer magnet pockets 7a, 7b (see FIG. 2).

The fourth fluid guide element 37 is designed as a protrusion projecting centrally from the collar 27 into the cooling channel section 21 and optimizes the flow cross-section for the cooling fluid flowing into the radially outer clearances of the radially outer magnet pockets 7a, 7b.

As is apparent from FIG. 1, a radially inner portion of the fourth cooling channel 18 is also sectionally formed by through-holes 38 in the shaft 4, which are arranged at an axial position corresponding to the end face 19 of the rotor core 2. Similarly to the second cooling channel 15, a radially outer portion of respective cooling channel sections 39, 40 is also delimited by the end face 19 and an end plate 41 arranged thereon. The design of the end plate 41 corresponds to the above-described design of the end plate 25, so that the cooling channel sections 39, 40 are designed analogously to the cooling channel section 21, 22 of the second cooling channel 15.

At a free end 4b of the shaft 4 located opposite the separating element 5, the rotor assembly 1 comprises a closure element 42 in the form of a dummy plug, which axially delimits the second shaft section 9.

In addition, the rotor assembly 1 comprises a plurality of sealing means that prevent the cooling fluid from exiting the cooling channel system 13:

The separating element 5 comprises a first sealing means 43, which is arranged in a radial groove 44 formed on the separating section 10 and extending in the circumferential direction and seals the shaft sections 8, 9 with respect to one another. The first sealing means 43 is an O-ring.

A second sealing means 45 in the form of an O-ring is provided inside a radial groove 46 of the closure element 42 extending in the circumferential direction. Moreover, a surface 47 of the closure element 42 extending in the circumferential direction is roughened and provided with a third sealing means 48 in the form of an adhesive layer, so that the second sealing means 45 and the third sealing means 48 seal the closure element 42 with respect to the shaft 4.

The end plates 25, 41 are sealed with respect to the rotor core 2 by a fourth sealing means 49 and a fifth sealing means 50, which are each arranged in an axial groove 51 that is formed in the collar 27 and extends in the circumferential direction. On the end face 52 located opposite the rotor core 2, the end plates 25, 40 moreover include a bead 53, which is formed in the circumferential direction around the through-opening 31 (see FIG. 3) and in which a sixth sealing means 54 or a seventh sealing means 55 is arranged inside a radial groove 56 extending in the circumferential direction.

For further sealing of the rotor core 2, the rotor core comprises two outer sealing layers (not shown), which are created by dipping the rotor core, without the permanent magnets 3a to 3d accommodated therein, twice into a liquid resin material.

The rotor assembly 1 additionally comprises a connecting element 57, in relation to which the shaft 4 can be rotated. The free end 4a of the shaft 4 associated with the first shaft section 8 opens into the connecting element 57 and is connected in a fluid-conducting manner to a first feed channel 58 of the connecting element 57.

In addition, the fluid guide section 11 also opens into the connecting element 57 at the free end 4a and is connected in a fluid-conducting manner to a second feed channel 59. The feed channels 58, 59 extend axially spaced from one another in the radial direction and open into a lateral surface of the substantially cylindrical connecting element 57. Moreover, the connecting element 57 comprises cooling fluid connections 60, 61 arranged on the lateral surface of the connecting element, for example so as to connect fluid lines that supply or discharge the cooling fluid to the feed channels 58, 59. Moreover, the connecting element 57 comprises a radial shaft seal 62 in which the shaft 4 can rotate.

It is shown only by way of example in FIG. 1 that the cooling fluid reaches the first shaft section 8 through the first feed channel 58, flows through the first cooling channel 14, the second cooling channel 15, the third cooling channel 17, the fourth cooling channel 18 and the fifth cooling channel 20, and flows back into the second feed channel 59 of the connecting element 57. It is likewise possible that the cooling fluid flow is implemented in the opposite direction.

Figure 5:
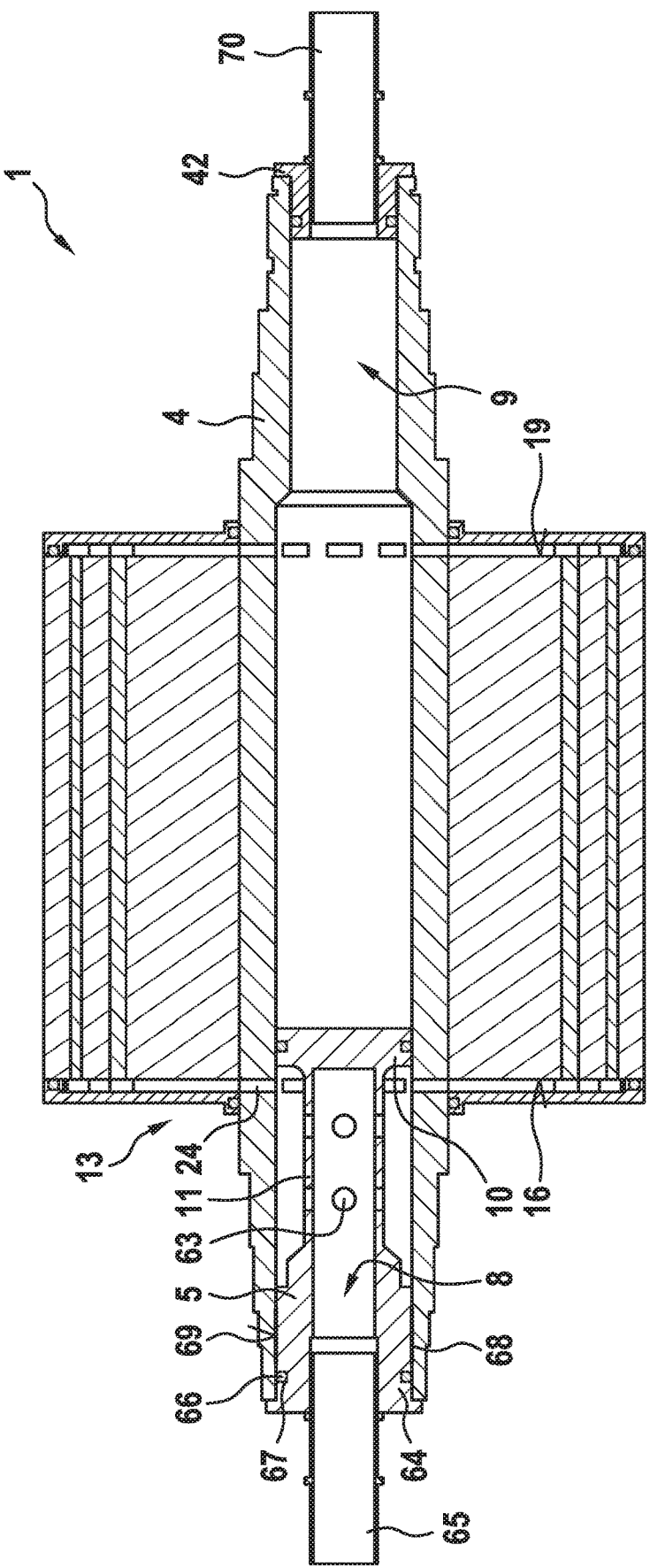
FIG. 5 shows a sectional illustration of a further exemplary embodiment of the rotor assembly according to the invention.

FIG. 5 shows a sectional illustration of a further exemplary embodiment of a rotor assembly 1, which corresponds to the rotor assembly shown in FIG. 1 except for the deviations described hereafter. Identical or similarly acting components of the exemplary embodiments are denoted by identical reference numerals. The rotor assembly 1 according to FIG. 5 differs primarily in that the cooling fluid can be introduced into and discharged from the shaft 4 at different free ends 4a, 4b.

For this purpose, the separating section 10 of the separating element 5 is designed so as to completely separate the shaft 4 at an axial position between the end faces 16, 19. This means that the second shaft section 9 does not extend through the first shaft section 8. Likewise, the fluid guide section 11 is axially completely delimited by the separating section 10. In addition, the fluid guide section 11 includes multiple through-holes 63 to allow the cooling fluid to exit the fluid guide section 11 and reach the through-holes 24.

At the free end 4a of the shaft 4, the separating element 5 includes an end section 64, which protrudes into the free end 4a. The fluid guide section 11 opens into the end section 64, so that the cooling fluid is able to reach the first shaft section 8 through a cylindrical feed element 65. The end section 64 is sealed, analogously to the closure element 42, by a sealing means 66 in the form of an O-ring, which is arranged in a radial groove 67 extending in the circumferential direction, and by means of a sealing means 68 in the form of an adhesive layer arranged on a roughened surface 69 of the end section 64.

The closure element 42 is not designed as a dummy plug in this exemplary embodiment, but has a passage for a further feed element 70, so as to conduct the cooling fluid out of the second shaft section 9 after the fluid has been introduced into the fluid guide section 11 and has flown through the cooling channel system 13. Analogously to the first exemplary embodiment, the direction of the cooling fluid flow may also be reversed in this exemplary embodiment.

Figure 6:
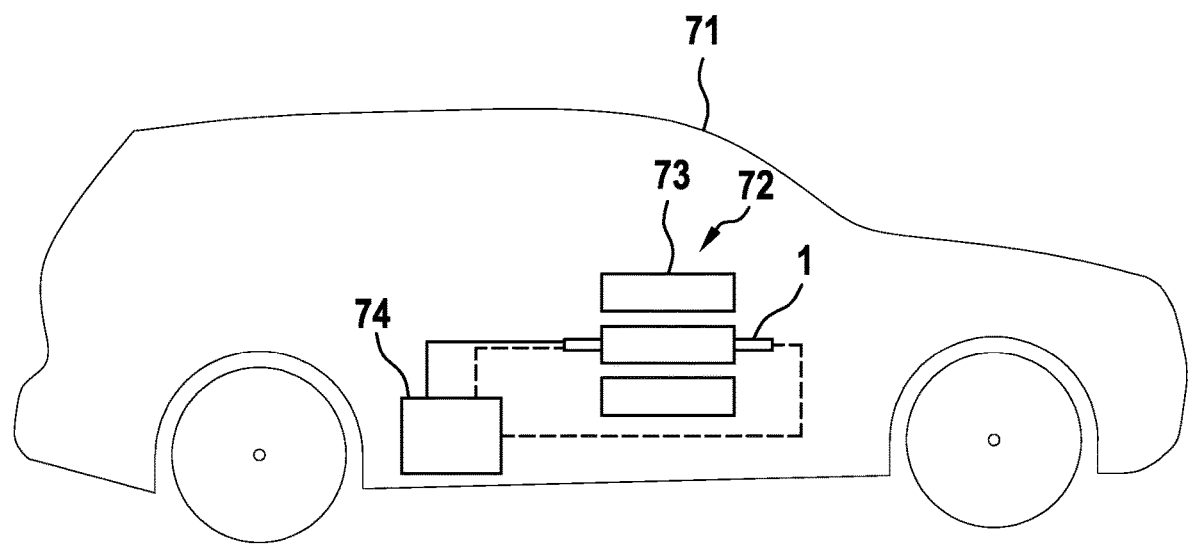
FIG. 6 shows a schematic diagram of a vehicle comprising one exemplary embodiment of the electrical machine according to the invention.

FIG. 6 shows a schematic diagram of a vehicle 71 in the form of an electric vehicle or a hybrid vehicle, comprising an electrical machine 72, which is configured to drive the vehicle 71. The electrical machine 72 comprises a stator 73 and a rotor assembly 1 according to one of the above-described exemplary embodiments, which is rotatably mounted therein. A cooling circuit comprising the cooling channel system 13 is closed by means of a cooling device 74, which comprises a pumping means and a heat exchanger.

FIG. 7 shows a sectional illustration of a further exemplary embodiment of an electrical machine 72 including a further exemplary embodiment of a rotor assembly 1, which corresponds to the rotor assembly shown in FIG. 1 except for the deviations described hereafter. Identical or similarly acting components of the exemplary embodiments are denoted by identical reference numerals.

Instead of a cooling path that extends from the shaft back into the shaft, the electrical machine 72 implements spray cooling of winding heads 75, 76 of the stator 73. This means that the cooling fluid is not returned into the shaft, but exits the cooling channel system 13 and is sprayed onto the winding heads 75, 76.

Initially, the rotor assembly 1 differs in that no separating element is provided, so that the first cooling channel 14 extends from the first free end 4a continuously in the axial direction to a termination 77 located beyond the end face 19. This is implemented in FIG. 7 in that the interior of the shaft 4 is formed by a blind hole. As an alternative, the shaft 4 can also be a hollow shaft comprising the closure element 42 (see FIG. 1). The rotor core 2 of the rotor assembly 1 is identical to the first exemplary embodiment.

The cooling channel system 13 includes the cooling channel 14 extending in the axial direction in the interior of the shaft 4, and a second cooling channel 15, which connects to the first cooling channel section 14 and extends along the end face 16 of the rotor core 2. The second cooling channel 15 is delimited by the first end plate 25 and the end face 16 of the rotor core 2. In addition, a third cooling channel 17, which connects to the second cooling channel 15, and a further third cooling channel 17a (see FIG. 8) are provided. The further third cooling channel 17a connects to a fourth cooling channel 18 (see FIG. 8), which extends along the end face 19 of the rotor core 2 and connects to the first cooling channel 14. The second cooling channel 15 and the fourth cooling channel 18 are thus connected parallel to the first cooling channel 14 in terms of fluid mechanics, so that flows in opposite directions through the third cooling channels 17, 17a are possible.

FIG. 8 shows a sectional view of the electrical machine 72, with a cutting plane rotated compared to FIG. 7 by the angular spacing between two adjoining magnet pocket systems 6 (see FIG. 2), so that, in contrast to FIG. 7, the third cooling channel 17a is visible. The cooling channel sections 23a, 23b of the third cooling channels 17, 17a extend alternately in the circumferential direction through the clearances of the magnet pocket systems 6 (see FIG. 2). The fourth cooling channel 18 is delimited on the radial outside by the second end plate 41 and the end face 19 of the rotor core 2 and is delimited on the radial inside by through-holes 38.

A respective cooling channel section 23a, 23b of the third cooling channel 17 opens into a cooling fluid outlet section 78 of the second end plate 41, and a respective cooling channel section 23a, 23b of the further third cooling channel 17a opens into a cooling fluid outlet section 78 of the first end plate 25. The cooling fluid outlet sections 78 are each connected via a cooling fluid outlet channel 79 formed in the end plate 25, 41 to an opening 80. The opening 80 is formed on a lateral surface 81 of a respective end plate 25, 41, so that the cooling fluid is diverted out of the axial flow direction along a respective third cooling channel 17, 17a into a substantially radial flow direction. Upon exiting the opening 80, the cooling fluid is thus sprayed directly on the winding heads 75, 76, thereby cooling the same.

FIG. 9 shows a perspective detailed view of an exemplary embodiment of the first end plate 25, which has an identical design to the second end plate 41 (see FIGS. 7 and 8). The end plates 25, 41 are merely arranged offset in the circumferential direction on the rotor core 2 by the angular spacing between two magnet pocket systems 6 (see FIG. 2).

The end plate 25 shown in FIG. 9 essentially corresponds to that shown in FIG. 3, however only half the cooling channel sections 21, 22 are provided, which extend to the through-opening 31. The cooling fluid outlet sections 78 are formed between a respective pair of adjoining cooling channel sections 21, 22 and delimited by a respective elevation 28, 29. Between the first radial position and the second radial position, the cooling fluid outlet sections 78 essentially have the same shape as the cooling channel sections 21, 22, but are sealed with respect to the through-opening 31 at the first radial position.

Each cooling fluid outlet section 78 comprises first fluid guide elements 33a and second fluid guide elements 34a, which correspond to those of the cooling channel sections 21, 22. No third and fourth fluid guide elements are provided in the end plate 25 shown in FIG. 9. However, these can also be additionally provided in the cooling channel sections 21, 22 and, if necessary after modification of the cooling fluid outlet channels 79, in the cooling fluid outlet sections 78.

As is apparent from FIGS. 7 and 8, the lateral surface 81 of the end plate 25 is widened in the axial direction compared to that from FIG. 3 so as to achieve a sufficient material thickness for forming the cooling fluid outlet channels 79. On the end face 52 located opposite the collar 27, the end plate 25 thus includes a radially outer bead 82, in addition to the radially inner bead 53. In addition, the sealing means 49, 50, 54, 55 and optionally the sealing means 45, 48 (see FIG. 1), are provided in the rotor assembly 1 according to FIGS. 7 and 8.

At the free end 4a, the rotor assembly 1 additionally comprises a connecting element 42 including a radial shaft seal 62 so as to introduce the cooling fluid into the first cooling channel 14 or the interior of the shaft 4. When the above-described electrical machine 72 is used in a vehicle 71 corresponding to FIG. 6, a fluid collection device, such as an oil pan, is typically provided in a machine housing, in which the sprayed cooling fluid can be collected. In this case, the cooling device 74 is connected to the shaft 4 on the one hand, and to the fluid collecting device on the other hand.

In further exemplary embodiments of the end plate 25, the elevations 28, 29 can be designed in a rib-shaped manner in the exemplary embodiment shown in FIG. 9, as is the case in FIG. 3. Likewise, the elevations 28, 29 can be continuous in the exemplary embodiment shown in FIG. 3, as is the case in FIG. 9.

The invention claimed is:

1. An end plate for a rotor assembly of an electrical machine, comprising:
    a central through-opening for feeding through a shaft, a collar formed on an end face of the end plate on a radial outside in a circumferential direction and a plurality of elevations on the end face, the elevations and the collar axially delimiting a cooling channel, the cooling channel forming a plurality of cooling channel sections, which are delimited on both sides by a respective elevation, two elevations delimiting a cooling channel section being spaced apart from one another by a first arc length at a first radial position between the through-opening and the collar and being spaced apart from one another by a second arc length that is greater than the first arc length at a second radial position delimited by the collar,
    wherein each cooling channel section comprises at least one fluid guide element between the first radial position and the second radial position.

2. The end plate according to claim 1, wherein the at least one fluid guide element is provided which is formed by a protrusion of one of the elevations.

3. The end plate according to claim 1, wherein the at least one fluid guide element is provided which is formed by a free elevation, having a same extension in two orthogonal directions of a plane that is perpendicular to the axial direction.

4. The end plate according to claim 2, wherein the fluid guide element formed by the protrusion is arranged further to the radial inside than the at least one fluid guide element formed by the free elevations.

5. The end plate according to claim 1, wherein the at least one fluid guide element is provided which is formed by a free elevation extending longitudinally in the radial direction.

6. The end plate according to claim 2, wherein a further fluid guide element that is symmetrical with respect to a plane extending in the radial direction through the center of the cooling channel sections is provided for the er-a respective further fluid guide element.

7. The end plate according to claim 1, wherein the at least one fluid guide element is provided which is designed as a protrusion projecting centrally from the collar into the cooling channel section.

8. The end plate according to claim 1, wherein the cooling channel sections extend to the through-opening.

9. The end plate according to claim 1, wherein the cooling channel sections continue from the first radial position in a linear manner to the through-opening.

10. The end plate according to claim 1, further comprising cooling fluid outlet sections which are delimited by the elevations and which are each formed between the first radial position and the second radial position and are connected via a cooling fluid outlet channel to an opening formed in the end plate.

11. The end plate according to claim 10, wherein the opening is formed on a lateral surface of the end plate.

12. The end plate according to claim 10, wherein the cooling fluid outlet sections and the cooling channel sections are arranged alternately in the circumferential direction.

13. The end plate according to claim 10, wherein each of the cooling fluid outlet sections comprises at least one fluid guide element.

14. A rotor assembly for an electrical machine, comprising:
    a rotor core, a plurality of permanent magnets, which are each arranged inside a magnet pocket formed in the rotor core, forming a clearance extending in the axial direction, the shaft, which is non-rotatably connected to the rotor core, and the at least one end plate according to claim 1, which is arranged at an end face on the rotor core.

15. An electrical machine for a vehicle, comprising:
    a stator and the rotor assembly according to claim 14 arranged inside the stator.

* * * * *